US008764514B2

(12) United States Patent
Beaudonnet

(10) Patent No.: US 8,764,514 B2
(45) Date of Patent: Jul. 1, 2014

(54) SHOT BLASTING PARTICLES AND METHOD OF USING

(75) Inventor: Anne-Laure Beaudonnet, Salon de Provence (FR)

(73) Assignee: Saint-Gobain Centre de Recherches et d'Etudes European, Courbevoie (FR)

( * ) Notice: Subject to any disclaimer, the term of this patent is extended or adjusted under 35 U.S.C. 154(b) by 898 days.

(21) Appl. No.: 12/808,902

(22) PCT Filed: Dec. 16, 2008

(86) PCT No.: PCT/FR2008/052321
§ 371 (c)(1),
(2), (4) Date: Nov. 10, 2010

(87) PCT Pub. No.: WO2009/081026
PCT Pub. Date: Jul. 2, 2009

(65) Prior Publication Data
US 2011/0053463 A1    Mar. 3, 2011

(30) Foreign Application Priority Data

Dec. 20, 2007  (FR) ..................... 07 60149

(51) Int. Cl.
  B24C 1/10   (2006.01)
  B24C 11/00  (2006.01)
  C04B 35/10  (2006.01)
  C09K 21/02  (2006.01)

(52) U.S. Cl.
USPC ................ 451/38; 29/81.06; 51/308; 51/309; 72/53; 451/57; 451/60; 451/330; 501/104; 501/105

(58) Field of Classification Search
USPC ........... 51/307, 308, 309; 72/53; 451/38, 330, 451/37, 57, 60; 501/103, 104, 105; 428/402; 29/81.01, 81.06
See application file for complete search history.

(56) References Cited

U.S. PATENT DOCUMENTS

| | | | | |
|---|---|---|---|---|
| 4,106,947 | A * | 8/1978 | Recasens et al. | 501/107 |
| 5,502,012 | A * | 3/1996 | Bert et al. | 501/103 |
| 7,811,496 | B2 * | 10/2010 | Celikkaya et al. | 264/232 |
| 8,168,554 | B2 * | 5/2012 | Boussant-Roux et al. | 501/104 |
| 2002/0028094 | A1 * | 3/2002 | Sakemi et al. | 399/276 |
| 2002/0143404 | A1 * | 10/2002 | Hayashi et al. | 623/23.57 |
| 2003/0148710 | A1 * | 8/2003 | Esser et al. | 451/39 |
| 2010/0042223 | A9 * | 2/2010 | Zinger et al. | 623/18.11 |

FOREIGN PATENT DOCUMENTS

| | | |
|---|---|---|
| EP | 0 662 461 A1 | 7/1995 |
| JP | A-7-206518 | 8/1995 |
| JP | A-2003-76133 | 3/2003 |
| JP | A-2004-148414 | 5/2004 |
| JP | A-2006-305694 | 11/2006 |
| JP | A-2007-245248 | 9/2007 |

OTHER PUBLICATIONS

International Search Report issued in Patent Application No. PCT/FR2008/052321, dated Oct. 13, 2009 (with translation).
Mar. 19, 2013 Japanese Office Action issued in Japanese Patent Application No. 2010-538864 (with machine generated translation).

* cited by examiner

*Primary Examiner* — Timothy V Eley
(74) *Attorney, Agent, or Firm* — Oliff PLC

(57) ABSTRACT

Shot blasting particles are constituted by a ceramic material having an apparent relative density of more than 4.0 and less than 5.0 and comprising more than 5% of silica, as a percentage by weight based on the oxides.

29 Claims, 1 Drawing Sheet

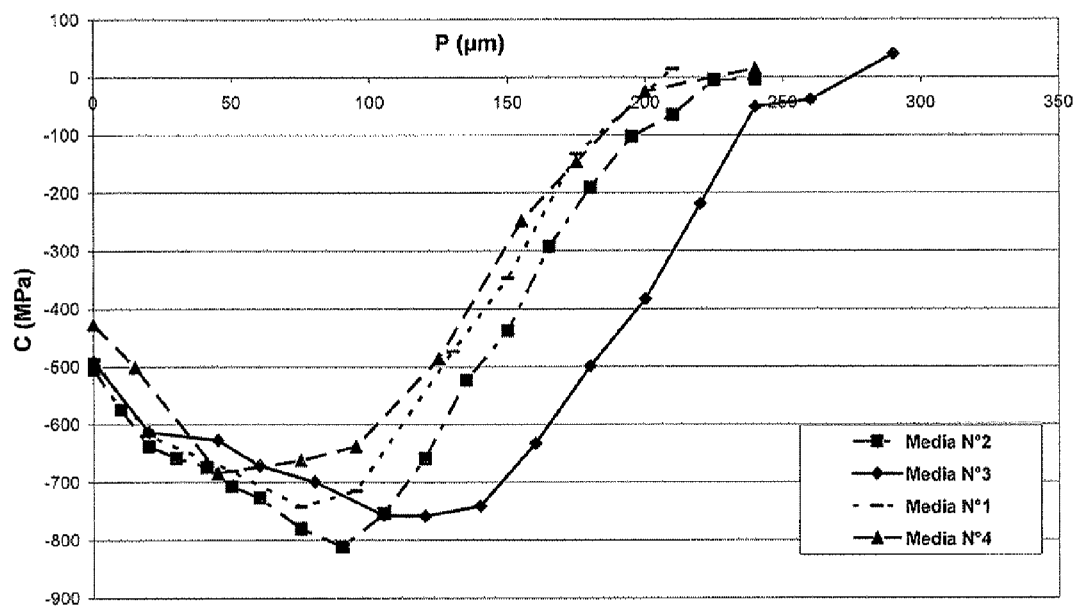

SHOT BLASTING PARTICLES AND METHOD OF USING

The invention relates to a shot blasting method, in particular for the treatment of metallic surfaces, for example steel surfaces, and particles that may be used in said method.

Shot blasting consists in projecting particles, generally beads, at high velocity against the part to be treated. The particles are produced from materials of hardness that is adapted to the aim to be achieved. Steel beads or ceramic beads are routinely used.

Shot blasting may be carried out for the purposes of cleaning, for example to remove rust (descaling), or to carry out compressive pre-stressing of the surface of a part (shot peening). Said pre-stressing can improve the properties of the treated part by surface hardening (work hardening). As an example, it can improve fatigue strength or corrosion resistance. Shot peening is thus conventionally carried out, for example, in order to improve the service characteristics of highly stressed parts such as car parts, in particular gears, transmission shafts, springs, torque rods, connecting rods, crankshafts, etc.

PRIOR ART

ZIRSHOT® beads sold by Saint-Gobain ZirPro are zirconia-silica beads with a relative density of 3.76 that are widely used for shot peening.

EP-0 578 453 also describes sintered zirconium beads intended for shot peening.

AIM AND SUMMARY OF THE INVENTION

Projecting ceramic beads cannot always create pre-stresses over a sufficient thickness. For this reason, the shot blasting method may include a first step of projecting metal beads followed by a second step of projecting ceramic beads. The thickness of the superficial layer of the part treated by shot blasting is thus increased.

One aim of the invention is to provide a shot blasting method that can effectively create high residual surface stresses in a superficial layer of the treated part.

The invention proposes a shot blasting method comprising an operation for projecting particles onto a surface of a part, said method being remarkable in that the particles have an apparent relative density of more than 4.0, or even more than 4.3 or indeed more than 4.5, and less than 5.0 or even less than 4.9.

As becomes apparent from the following detailed description, surprisingly, this range of densities means that remarkable performances can be achieved.

The method may also include one or more of the following optional features:
  the particles are beads;
  the particles are ceramic particles;
  the particles are particles obtained by fusion;
  the particles have hardness of more than 700 $HV_{0.5}$, preferably more than 800 $HV_{0.5}$, or even more than 900 $HV_{0.5}$, and/or less than 1100 $HV_{0.5}$, or even less than 975 $HV_{0.5}$, the hardness preferably being in the range 900 $HV_{0.5}$ to 1100 $HV_{0.5}$;
  the particles comprise more than 30% of zirconia ($ZrO_2$), or even more than 40%, 50%, 60% or 70% of zirconia, and/or less than 90%, or even less than 80%, of zirconia ($ZrO_2$), as percentages by weight based on the oxides;
  the particles comprise more than 5% by weight of silica ($SiO_2$), or even more than 10% or more than 13% of silica, and/or less than 60%, or even less than 50%, 30% or 20% of silica, as percentages by weight based on the oxides;
  the particles comprise more than 1%, or even more than 1.5%, 2.0%, 4% or 4.5% of alumina ($Al_2O_3$) and/or less than 10%, or even less than 7% or less than 5% of alumina, as percentages by weight based on the oxides;
  the zirconia, silica, and alumina together preferably represent more than 80%, or even more than 90% or indeed more than 95% or substantially 100% of the particle composition;
  the maximum quantity of $Fe_2O_3$ is 0.5%, as a percentage by weight based on the oxides; examples of other possible oxides are MgO, CaO, and $Na_2O$; preferably, the particles do not include iron, in particular neither in the form of the oxide nor in the metallic form;
  the particle size is less than 2 millimeters (mm), preferably less than 1 mm;
  the treated surface is a metallic surface, for example steel;
  the treated surface is a surface of a car part. The treated part may be selected from a sprocket wheel, a transmission shaft, a spring, a torque rod, a connecting rod, and a crankshaft;
  the particles are projected at a velocity of more than 40 meters per second (m/s), preferably more than 48 m/s, or even more than 50 m/s, or even more than 55 m/s;
  in one embodiment, only the particles as defined above, and possibly having one or more of the optional features mentioned above, are projected;
  in one embodiment, the method comprises only a single projection operation, i.e. after projection of said particles, no subsequent projection operation is carried out. In other words, the method does not include a step of projection of a medium other than the particles mentioned above;
  in another embodiment, the method also comprises a step of projection of a medium other than the particles mentioned above. In particular, the method may include at least two projection operations, a first of said operations constituting a shot blasting method in accordance with the invention, the second of said operations, before or after the first operation, not constituting a shot blasting method in accordance with the invention;
  the method does not include a step of projecting metallic beads.

The invention also provides the particles described above in the context of their use in a shot blasting method in accordance with the invention. In particular, it provides shot blasting particles, in particular in the form of beads, having an apparent relative density of more than 4.0, or even more than 4.3 or more than 4.5, and less than 5.0, or even less than 4.9. Said particles may in particular be constituted from a ceramic material and/or be obtained by fusion. They may have a hardness of more than 700 $HV_{0.5}$, or more than 800 $HV_{0.5}$, or even in the range 900 $HV_{0.5}$ to 1100 $HV_{0.5}$. They may also have a size of less than 2 mm, or even less than 1 mm.

In one embodiment they comprise, as percentages by weight based on the oxides:
  more than 30%, or even more than 70%, and/or less than 90%, of zirconia ($ZrO_2$); and/or
  more than 5% and less than 60%, or even less than 20%, of silica; and/or
  more than 1%, or even more than 4%, and less than 10% or even less than 7%, of alumina ($Al_2O_3$).

BRIEF DESCRIPTION OF THE FIGURES

Other characteristics and advantages of the invention become more apparent from the following detailed description and from a study of the accompanying drawings, in which FIG. 1 represents a graph showing, for various media, the change in residual stresses ("C") as a function of the depth ("P") from the surface of a part that has been shot blasted with said media.

DEFINITIONS

The term "beads" means a particle with sphericity, i.e. a ratio between its smallest diameter and its largest diameter, of 0.75 or more, regardless of the manner in which said sphericity has been obtained. In one embodiment of the invention, the beads have sphericity of 0.8 or more, preferably 0.9 or more.

The term "fused product" or "product obtained by fusing" means a product obtained by solidification, by cooling a molten liquid. A "molten liquid" is a mass that must be contained in a container in order to retain its shape. A molten liquid may contain solid portions but in insufficient quantity to provide said mass with any structure.

The term "median size" of a set of grains, generally denoted D50, means the size dividing the grains of said set into first and second populations that are equal in mass, said first and second populations comprising only grains having a size respectively greater than or smaller than the median size.

The term "size" of a particle is the mean of its largest dimension dM and of its smallest dimension dm: (dM+dm)/2.

The term "zirconia" means zirconium oxide, $ZrO_2$. A small amount of $HfO_2$, which is chemically undissociable from $ZrO_2$ and has similar properties, is always naturally present in sources of zirconia, in quantities of less than 2%.

The term "silica" means silicon oxide, $SiO_2$.

The term "alumina" means aluminum oxide, $Al_2O_3$.

Unless otherwise mentioned, the percentages used to characterize a composition always refer to percentages by weight based on the oxides.

DETAILED DESCRIPTION

Shot blasting is a well-known technique; it may be employed in all of its variations to implement the method of the invention, provided that the relative density of the projected particles is in the range 4.0 to 5.0.

The nature of the particles is also not a limitation. However, in one preferred embodiment, the projected particles are ceramic beads obtained by fusion, with a relative density that is preferably in the range 4.3 to 4.9, more preferably in the range 4.5 to 4.9.

In order to produce said beads, a method comprising the following steps may be carried out:

a) preparing a starting charge comprising the constituents of the beads to be produced and/or precursors of said constituents;

b) melting the starting charge in order to form a molten liquid;

c) casting the liquid to form a jet of molten liquid and dispersing said jet into droplets;

d) cooling the droplets to form beads;

e) optionally, grain size reduction, in particular by milling, and/or grain size selection.

In step a), powdered constituents and/or precursors are mixed in order to constitute a substantially homogeneous mixture.

In accordance with the invention, the person skilled in the art should adjust the composition of the starting charge in order to obtain beads with the desired composition at the end of step d). In the context of producing ceramic beads, the chemical analysis of the beads is generally substantially identical to that of the starting charge. Furthermore, where necessary, for example in order to take into account the presence of volatile oxides, or to take into account the loss of $SiO_2$ when melting is carried out under reducing conditions, the person skilled in the art knows how to adapt the composition of the starting charge as a consequence.

In step b), the starting charge is melted, preferably in an electric arc furnace. Electrofusion means that large quantities of product can be produced in high yields. However, the use of any known furnace may be envisaged, such as an induction furnace, a solar furnace or a plasma furnace, for example, provided that it can melt the starting charge, preferably completely. The conditions may be oxidizing or reducing.

In step b), it is possible, for example, to use the arc fusion method described in French patent FR-1 208 577 and its patents of addition, numbers 75893 and 82310.

In step c), the molten liquid is cast in order to form a jet.

In step d), said jet is dispersed into small liquid droplets the majority of which, under surface tension, assume a substantially spherical shape. This dispersion may be carried out by blowing, in particular with air and/or steam, or using any other method of atomizing a fused material that is known to the person skilled in the art.

In step e), the droplets are cooled to solidify into the form of solid beads. Cooling may be a result of the dispersion. The cooling rate may be adapted to the desired degree of crystallization.

In an optional step f), the size of the beads is adjusted in order to obtain a particular powder. To this end, the particles obtained by fusing may be milled, and then undergo grain size sorting, by sieving or by separation in air.

The invention also provides beads produced using a method comprising the above steps a) to d) and optionally step e).

EXAMPLES

The following non-limiting examples are provided with the aim of illustrating the invention.

In these examples, various shot blasting media were tested. The characteristics of these various media are shown in Table 1. Medium 2 corresponds to the reference product, ZIR-SHOT® Z425.

The apparent relative density was measured using an automatic Accupyc 1330 helium pycnometer.

The microhardness was measured using a Vickers Zwick 3212 micro-durometer. The values obtained correspond to Vickers $HV_{0.5}$ hardnesses.

The chemical analysis was carried out using X ray fluorescence.

The grain size analysis was carried out by manual sieving using square mesh sieves in accordance with ISO standard 3310.

All of the particles of the tested media were ceramic beads obtained by fusion and with a size in the range 425 micrometers (μm) to 600 μm.

In order to carry out the tests, each medium was projected onto a XC65 steel target using a Venturi effect gun provided with a 80 mm diameter projection nozzle positioned 150 mm from the target, with an angle of projection of 85° and with as high a velocity as possible ("maximum velocity" column in Table 1). Projection was continued until a degree of coverage (percentage of surface impacted by projected media) of 125% was obtained.

The residual stresses were then measured by X ray diffraction using a Siemens D500 apparatus starting from an analysis of the mean deformation of the crystallographic planes as a function of the orientation thereof. The results are shown in FIG. 1.

TABLE 1

| Medium N° | 1 | 2 | 3 | 4 |
|---|---|---|---|---|
| Apparent relative density | 3.17 | 3.83 | 4.66 | 5.33 |
| Microhardness $HV_{0.5}$ (kg/mm$^2$) | 785 | 803 | 945 | 984 |
| $ZrO_2$ | 41.5 | 67.5 | 73.4 | 63.0 |
| $SiO_2$ | 43.0 | 30.4 | 15.0 | 7.6 |
| $Al_2O_3$ | 8.1 | 1.3 | 4.7 | 5.0 |
| $Y_2O_3$ | | 0.1 | 6.2 | 3.8 |
| $CeO2$ | | | | 19.7 |
| D50 (μm) | 536 | 509 | 496 | 548 |
| Maximum velocity (m/s) | 60 | 60 | 60 | 46 |

It should be observed that the residual surface stresses, i.e. at a depth of zero, were substantially equivalent for test media 1 to 3. However, they were lower for medium 4.

It should also be observed that when the apparent relative density increases up to an apparent relative density of 4.66 (medium 3), the thickness of the superficial layer affected by shot blasting, i.e. the depth to which it extends, increases. Surprisingly, an increase in the apparent relative density beyond 5 (5.33 with medium 4) resulted, however, in a reduction in this thickness.

These tests also show that a high hardness medium (medium 4) does not systematically produce good results.

The depth of the point where the residual stresses are a maximum changes in the same manner, the maximum depth being reached at an apparent relative density in the range 4 to 5.

It should also be observed that the maximum rate that can be achieved is lower with ceramic beads with an apparent relative density of more than 5. Surprisingly, this drop in rate does not, however, result in an increase in residual surface stresses. In contrast, these are lower than with beads with a lower apparent relative density, in particular in the range 4 to 5.

In addition to the generation of residual stresses on the surface and close to the surface, one of the major effects of shot blasting is to modify the surface quality, and in particular to modify the roughness. A roughness that is too high may result in premature rupture of the shot blasted part; thus, it is important that it be controlled.

In the specific example below, 92V45 steel specimens were shot blasted in two passes: a first pass with steel beads or with ceramic beads with a relative density of 4.6 in accordance with the invention (medium No 5), followed by a second pass with conventional Z210 ceramic beads, with the shot blasting parameters allowing substantially identical residual stress levels to be obtained.

Characteristics of steel bead:
relative density: 7.7;
microhardness: 470 $HV_{0.5}$;
chemical analysis:
  Fe: complement to 100%;
  C: 0.85%-1.2%;
  Mn: 0.6%-1.2%;
  Si: 0.4-1.5%;
  Ph≤0.05%
  S≤0.05%
d50=1000 μm;
estimated velocity 45 m/s.
Characteristics of ceramic beads, medium No 5:
identical to those of medium No 3 with the exception of:
d50: 900 μm;
estimated velocity 48 m/s.
Characteristics of Z210 beads (Zirshot Z210): identical to those of medium No 2 with the exception of d50=255 μm.

TABLE 2

| | Residual surface stresses (Mpa) | Thickness produced (μm) | Ra (μm) |
|---|---|---|---|
| 1$^{st}$ pass, steel | −414 | 275 | 5.6 |
| 1$^{st}$ pass, medium No 5 | −552 | 300 | 4.0 |
| 2$^{nd}$ pass, steel+ Z210 | −707 | 220 | 5.2 |
| 2$^{nd}$ pass, medium No 5 + Z210 | −700 | 280 | 3.6 |

Table 2 shows that using the beads of the invention significantly improves the surface quality, and in particular reduces the mean roughness, Ra.

This table also demonstrates the advantage of a shot blasting method in accordance with the invention comprising a step of projecting a medium other than the particles of the invention.

As can clearly be seen here, the invention thus provides a shot blasting method that can efficiently create high residual stresses at the surface and in a superficial layer of the treated part.

Clearly, the present invention is not limited to the embodiments and implementations described, provided by way of non-limiting illustrative example.

In particular, the beads may be sintered beads having compositions or grain sizes other than those described above.

The shot blasting method may also be carried out in a cleaning application.

The invention claimed is:

1. Shot blasting particles constituted by a ceramic material comprising oxides, and having an apparent relative density of more than 4.0 and less than 5.0, and comprising more than 5% of silica, and more than 1% alumina, as a percentage by weight based on the oxides.

2. Particles according to claim 1, having an apparent relative density of more than 4.3.

3. Particles according to claim 1, having an apparent relative density of more than 4.5.

4. Particles according to claim 1, having an apparent relative density of less than 4.9.

5. Particles according to claim 1, in the form of beads.

6. Particles according to claim 1, comprising more than 10% of silica.

7. Particles according to claim 1, obtained by fusing.

8. Particles according to claim 1, obtained by sintering.

9. Particles according to claim 1, having a hardness of more than 700 $HV_{0.5}$.

10. Particles according to claim 9, having a hardness of more than 800 $HV_{0.5}$.

11. Particles according to claim 1, having a hardness in the range 900 $HV_{0.5}$ to 1100 $HV_{0.5}$.

12. Particles according to claim 1, having a size of less than 2 mm.

13. Particles according to claim 12, having a size of less than 1 mm.

14. Particles according to claim 1, comprising more than 30% and less than 90% of zirconia ($ZrO_2$), as percentages by weight based on the oxides.

15. Particles according to claim 1, comprising more than 60% and less than 80% of zirconia ($ZrO_2$), as percentages based on the oxides.

16. Particles according to claim 1, comprising more than 5% and less than 60% of silica, as percentages by weight based on the oxides.

17. Particles according to claim 1, comprising more than 10% and less than 30% silica, as percentages based on the oxides.

18. Particles according to claim 1, comprising less than 20% of silica, as a percentage by weight based on the oxides.

19. Particles according to claim 1, comprising less than 10% of alumina ($Al_2O_3$), as a percentage by weight based on the oxides.

20. Particles according to claim 1, comprising more than 4% and less than 7% alumina ($Al_2O_3$), as percentages based on the oxides.

21. Particles according to claim 1, in which zirconia, silica and alumina represent, together, more than 90% of the composition of the particles.

22. A shot blasting method comprising an operation for projecting particles onto a surface of a part, wherein said particles are in accordance with claim 1.

23. A method according to claim 22, wherein the particles are projected at a velocity of more than 40 m/s.

24. A method according to claim 23, wherein the particles are projected at a velocity of more than 55 m/s.

25. A method according to claim 22, comprising at least two projection operations, wherein a first projection operation is for the projection of the particles onto the surface of the part, and a second projection operation, before or after the first operation, is for projecting a medium other than the particles.

26. A method according to claim 22, wherein no metallic beads are projected.

27. A method according to claim 22, wherein only the particles are projected.

28. A method according to claim 22, wherein the treated surface is a metallic surface.

29. A method according to claim 22, wherein the treated surface is a surface of a car part.

* * * * *